UNITED STATES PATENT OFFICE.

DANIEL REPONY, OF PASSAIC, NEW JERSEY, ASSIGNOR TO THE MANHATTAN RUBBER MFG. COMPANY, A CORPORATION OF NEW JERSEY.

PROCESS OF COMPOUNDING LUBRICATED SULFUR AND RUBBER AND VULCANIZING.

1,372,041. Specification of Letters Patent. Patented Mar. 22, 1921.

No Drawing. Application filed September 24, 1919. Serial No. 325,937.

*To all whom it may concern:*

Be it known that I, DANIEL REPONY, a citizen of the United States, residing at Passaic, New Jersey, have invented certain new and useful Improvements in Processes of Compounding Lubricated Sulfur and Rubber and Vulcanizing, of which the following is a clear, full, and exact description.

This invention relates to the treatment of sulfur to modify its characteristic behavior under certain conditions, and particularly to the treatment of sulfur preparatory to its use in the vulcanizing of rubber. The invention also comprehends a novel process whereby a more uniform distribution of the sulfur throughout the rubber may be obtained, and whereby scorching or premature vulcanizing of the rubber is substantially eliminated.

Sulfur, by reason of its comparatively low melting point (about 240° F.), is very readily compressed into solid lumps, the heat evolved in the compression usually partially melting the sulfur together. Because of this characteristic of sulfur some difficulty has been experienced in its use as a vulcanizing agent, particularly in the mixing of certain stiff rubber compounds and when inexperienced workmen operate the mixing mill.

Heretofore, sublimated or precipitated sulfur has been used exclusively in the production of rubber compounds. To secure a uniform product and a uniform vulcanizing effect, it is naturally of fundamental importance that the small quantity of sulfur employed, ranging from 2% to 8% in soft rubber compounds up to 40% in hard rubber compounds, shall be incorporated in the rubber compound in as small particles as possible, and that this shall be distributed as uniformly as possible throughout the whole mass.

Because, however, of the readiness with which sulfur is compressed into solid lumps, it has been necessary to exercise great care in the mixing of the sulfur with the other ingredients of the compound. Even with the greatest care, however, there has been liability to the formation of lumps when the sulfur has been subjected to pressure between the rubber on one roll and the opposed steel roll of the mill. These lumps when once formed are not again crushed in the additional mixing and naturally affect the uniformity and the general quality of the rubber compound and cause trouble throughout the whole manufacturing operation.

To so treat the sulfur as to prevent it from forming lumps when subjected to pressure, and to insure its maintenance in the sublimated, precipitated or pulverized condition in which it is best adapted for use as a vulcanizing agent, is a principal object of the present invention.

I have discovered that when ordinary sulfur is first mixed with any suitable proportion of greasy or oily material, the behavior of the sulfur when subjected to pressure is quite different from that of sulfur which has not been so treated, and the sulfur may properly be said to have become lubricated. In this lubricated state it cannot be compressed into lumps under such conditions as are met with in the mixing of rubber compounds.

As the result of my experiments in the treatment of sulfur for the purposes hereinabove set forth, I have found that the most suitable oils or greases for effecting the lubrication of the sulfur are those derived from petroleum, such as the mineral oils, vaseline, etc., or the animal oils, such as neatsfoot oil, tallow, etc.; that is, those oils are most suitable which belong to the class of non-drying and non-saponifiable oils.

Although the oils or greases above mentioned have been found the most suitable where the sulfur is to be treated for any considerable length of time before its use, substantially any oil or grease may be used. For example, if the lubricated sulfur is to be used shortly after it has been prepared, then even a drying oil or grease may be used.

My experiments have shown that sulfur which contains as low as 2% of some of the above mentioned oily or fatty substances is lubricated sufficiently to prevent compacting or solidifying under the pressure incidental to the mixing of rubber, but any percentage of fatty matter may be mixed with the sulfur to meet special conditions. A mixture of about 6% of oil or grease with the sulfur has been found to give a suitable lubrication of the sulfur for most uses.

In addition to preventing the formation of sulfur lumps in the rubber compound, due to compression in the mixing operation, the use of the lubricated sulfur prevents what is commonly known in rubber factories as scorching. Scorching is a premature vulcanization of the rubber in spots and is due ordinarily to the excessive heat generated by friction in the mixing operation, this heat acting upon the sulfur which has been mixed with the other ingredients of the rubber compound to effect a local vulcanization during the mixing operation.

To avoid this scorching or premature local vulcanization, it is desirable to mix the sulfur with the other ingredients last,—that is, after the other ingredients have been mixed together. However, with the ordinary sulfur it has been found in most cases substantially impossible to mix the sulfur as the last ingredient because substantially every rubber compound, after being loaded with the usual mineral fillers, shoddy and the various substitutes, becomes considerably stiffer than raw rubber, and therefore the tendency to compression or compacting of the sulfur when mixed last is greater in such cases than if the sulfur were mixed at the same time the other ingredients are mixed. With the lubricated sulfur of the present invention, however, there is no liability to compression or compacting of the sulfur into a solid when it is mixed last, and therefore the sulfur can be put in after the other ingredients are mixed and yet be thoroughly mixed with the other ingredients without liability to the formation of lumps. By mixing the sulfur last, the liability to scorching is eliminated since there is no sulfur present to vulcanize the rubber when heat is generated during the mixing of the other ingredients.

What I claim as new is—

The process of making vulcanized rubber compounds which consists in first mixing together the rubber and other ingredients of the compound, with the exception of the vulcanizing agent, then mixing with said first mentioned mixture sulfur which has been treated with a lubricant, and then vulcanizing the resultant mixture.

Signed at Passaic, New Jersey, this 18 day of September, 1919.

DANIEL REPONY.

Witnesses:
A. W. VENNEMA,
CHAS. T. YOUNG.